United States Patent [19]

Feterl

[11] Patent Number: 5,184,715
[45] Date of Patent: Feb. 9, 1993

[54] MECHANICAL DRIVE FOR DUAL CONVEYOR SYSTEM

[75] Inventor: Leon G. Feterl, Salem, S. Dak.

[73] Assignee: Core Industries, Inc., Bloomfield Hills, Mich.

[21] Appl. No.: 698,492

[22] Filed: May 9, 1991

[51] Int. Cl.⁵ .............................................. B65G 33/32
[52] U.S. Cl. .................................. 198/667; 198/311; 414/376; 414/505
[58] Field of Search .............. 198/311, 314, 535, 536, 198/666, 667; 414/376, 505

[56] References Cited

U.S. PATENT DOCUMENTS

| | | | |
|---|---|---|---|
| 2,206,745 | 7/1940 | McKenzie | 198/667 X |
| 3,064,830 | 11/1962 | Reed | 198/667 X |
| 4,603,775 | 8/1986 | Plett | 198/311 X |
| 4,669,945 | 6/1987 | Pollard et al. | 414/505 |
| 4,963,066 | 10/1990 | Boppart | 198/311 X |

OTHER PUBLICATIONS

Flyer from Westfield Industries, Ltd., two pages.
Flyer from Hutchinson, one page.
Flyer from Feterl Manufacturing Co., two pages.
Flyer from Mayrath Industries, one page.
Document illustrating a bin sweep, twelve pages, by Feterl Manufacturing, Assignee of the present invention.

Primary Examiner—Joseph E. Valenza
Assistant Examiner—Tuan N. Nguyen
Attorney, Agent, or Firm—Moore & Hansen

[57] ABSTRACT

There is provided by the present invention a mechanical drive system for driving first and second screw conveyors from a single power source. This system includes a primary drive providing power to the first conveyor from the power source and a secondary drive that includes a pair of gear boxes and that supplies power to the second conveyor from the primary drive.

31 Claims, 3 Drawing Sheets

MECHANICAL DRIVE FOR DUAL CONVEYOR SYSTEM

The present invention relates to drive systems for screw conveyors generally and to a drive system for powering first and second screw conveyors from a single power source particularly.

BACKGROUND OF THE PRESENT INVENTION

Screw conveyors have long been used for transferring product from one location to another. Typically, each conveyor comprises a cylindrical housing enclosing an auger mounted on an auger shaft. The housing has input and output ends for receiving and discharging product respectively. The auger shafts are rotatably driven at either the input or output end of the conveyor, depending upon the particular arrangement in which it is used.

Screw conveyors such as those just described are commonly found in farming operations for transferring grain from a grain wagon or truck to a storage facility, such as a silo, bin or crib. The conveyors are sometimes driven by a farm tractor using the power take-off, sometimes by an electric motor, and sometimes by an hydraulic motor, in turn driven by pressurized hydraulic fluid from the tractor hydraulic system. Presently available systems use a combination of two separate conveyors to do the transference of the grain. Thus, a first or delivery conveyor is driven by the power take-off of a tractor and transports grain directly into the storage facility. The first conveyor receives the grain at its input end from a second or feeder, usually much shorter, conveyor, that receives grain from a the wagon, for example, at its input end and discharges it at its output end into the input end of the first conveyor. In setups such as just described, the second conveyor has traditionally been driven by either an electric or an hydraulic motor. Electric motors have a somewhat limited usefulness in that the dual conveyor systems are sometimes used where electrical power is not available. Additionally, electric motors of an easily handled size are incapable of delivering the same level of power to the second conveyor that the first conveyor receives from the power take-off. Similarly, hydraulic motors require a power source having a large hydraulic capacity. Their use thus requires tractors of minimum size and prevents a farmer from adequately utilizing his equipment in other ways.

Dual conveyor systems where both conveyors are driven from a single power source such as a tractor power take-off are known. One of these systems, for example, drives the second conveyor from its output end via an attachment to the auger shaft of the first conveyor. A second known type drives the second conveyor from its output end via a connection between the second conveyor and the input end of the first conveyor. The first mechanical drive system just mentioned is not desirable in that the connective drive for the second conveyor lies within the path of the grain being dispensed from the second conveyor into the first conveyor. The second system is undesirable in that it requires assembly and disassembly of the connecting drive between the second conveyor and the first conveyor when it is desired to pivot the second conveyor to the other side of the first conveyor at a desired location for receiving grain.

It would be desirable to have a dual conveyor system driven by a mechanical drive system connected to a single power source that did not require substantial disassembly of the drive system when the angular position of the second, feeder conveyor was changed relative to the first conveyor and that was driven at the input end of each conveyor.

SUMMARY OF THE PRESENT INVENTION

The present inventions provides a mechanical drive system for powering first and second screw conveyors from a single power source such as the power take-off shaft of a farm tractor. The first and second conveyors each include an elongate, substantially cylindrical housing rotatably supporting interiorly thereof an auger for conveying a product from an input end of the conveyor to an output end of the conveyor. In accordance with the present invention the output end of the second conveyor is pivotally supported by the input end of the first conveyor and provides product to the first conveyor The drive system includes a primary drive for directly transmitting power from the power source to the input end of the auger shaft of the first conveyor and a secondary drive for transmitting power from a location at the input end of the auger shaft of the first conveyor to the input end of the auger shaft of the second conveyor. The secondary drive includes first and second relatively rotatable gearboxes, first drive means connecting the first gearbox to the input end of the first conveyor auger shaft, second drive means connecting the first and second gearboxes to each other, and third drive means connecting the second gearbox to the input end of the auger shaft of the second conveyor. The relatively rotatable gearboxes permit the second conveyor to be pivoted with respect to the first conveyor about its pivotable attachment at its output end with the input end of the first conveyor without substantial disassembly of the secondary drive.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PRESENT INVENTION

Figure 1:
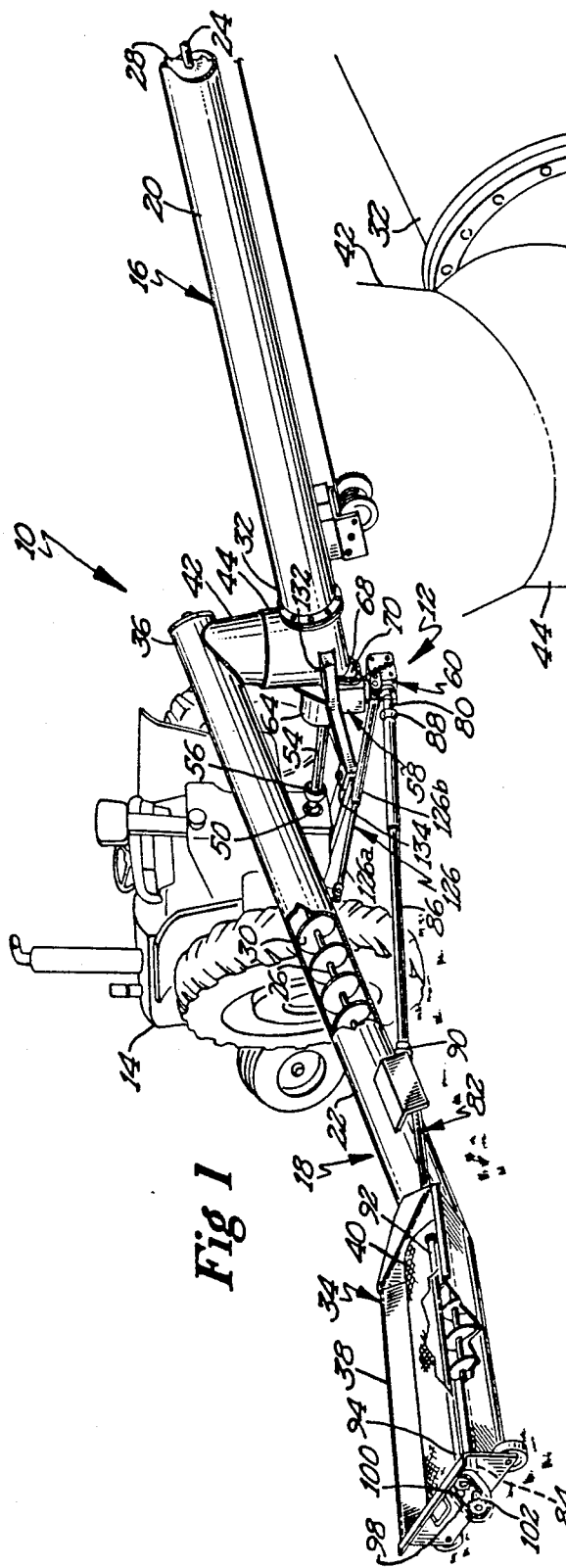
FIG. 1 is a perspective view illustrating a dual conveyor system having a mechanical drive for operating both conveyors from a single power source, such as a farm tractor.

FIG. 1 illustrates a dual screw conveyor system 10 powered by a mechanical drive system 12 from a single power source such as farm tractor 14. Dual conveyor system 10 includes first (only partially shown) and second screw conveyors 16 and 18 respectively. First and second conveyors 16 and 18 each comprise an elongate cylindrical housing 20, 22 enclosing an auger shaft 24, 26 supporting an auger 28, 30 respectively. First and second conveyors 16, 18 each have an input end 32, 34. Second conveyor 18 further includes an output end 36 feeding into input end 32 of first conveyor 16, while the output end of first conveyor 16 is not shown.

Input end 34 of second conveyor 18 includes a hopper 38 by which product is placed within the dual conveyor system and conveyed via second conveyor 18 from the input end 34 thereof to its output end 36 into input end 32 of first conveyor 16. Hopper 38 may include a screen 40 for screening out foreign material. Output end 36 of second conveyor 18 includes a chute 42 which is rotatable within a receiving socket 44 in a manner known to the art. The rotatable interconnection between chute 42 and socket 44 allows the angular positioning between first and second conveyors 16 and 18, respectively, to be varied over a range substantially in excess of 240°. Thus, when the first conveyor 16 is properly disposed for the unloading of product out of its output end, the second conveyor 18 may be rotated to its most usable and most accessible position with respect to the input end 34 thereof to receive grain from a supply source such as a truck or wagon. As noted, the dual conveyor system 10 is driven by a single power source such as farm tractor 14. The power take-off 50 of tractor 14 is connected to the input end 52 of first conveyor auger shaft 24 by a primary drive means such as telescoping drive shaft 54. Thus, the first screw conveyor 16 is directly driven by the connection to power take-off 50 of tractor 14. Primary drive means 54 includes a pair of universal joints 56 disposed one at each end thereof for attachment to power take-off 50 and as, best seen in FIG. 2, to input end 52 of auger shaft 24 in a known manner.

Figure 2:
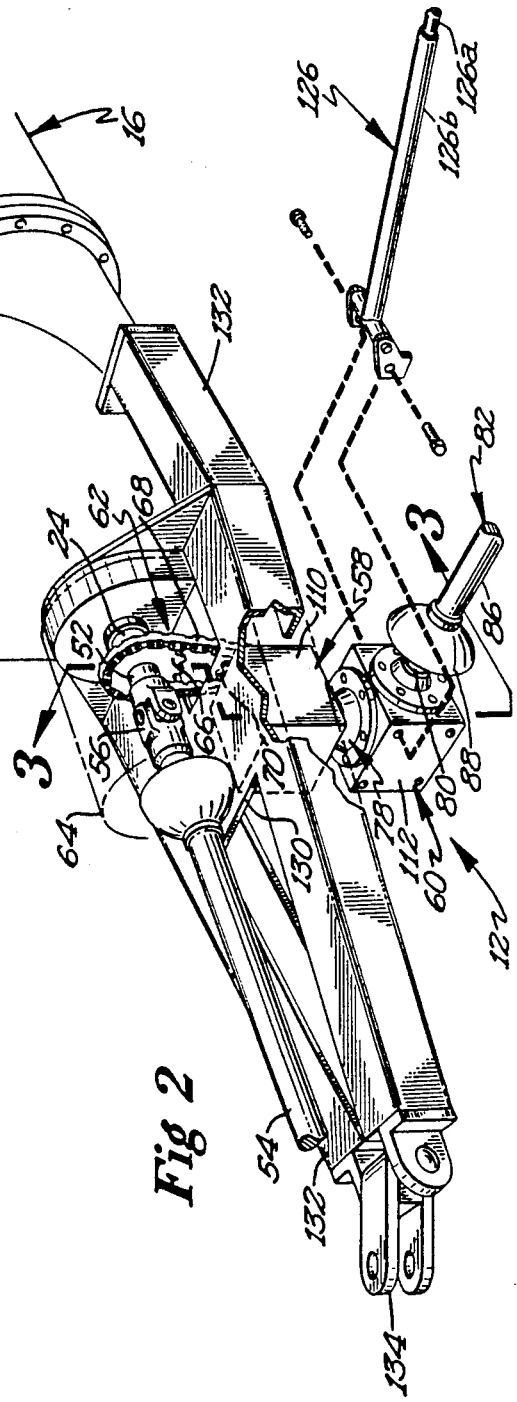
FIG. 2 illustrates the dual gear box system shown in FIG. 1 and the drive connection between the upper gear box and the auger shaft of the first conveyor.
Figure 3:
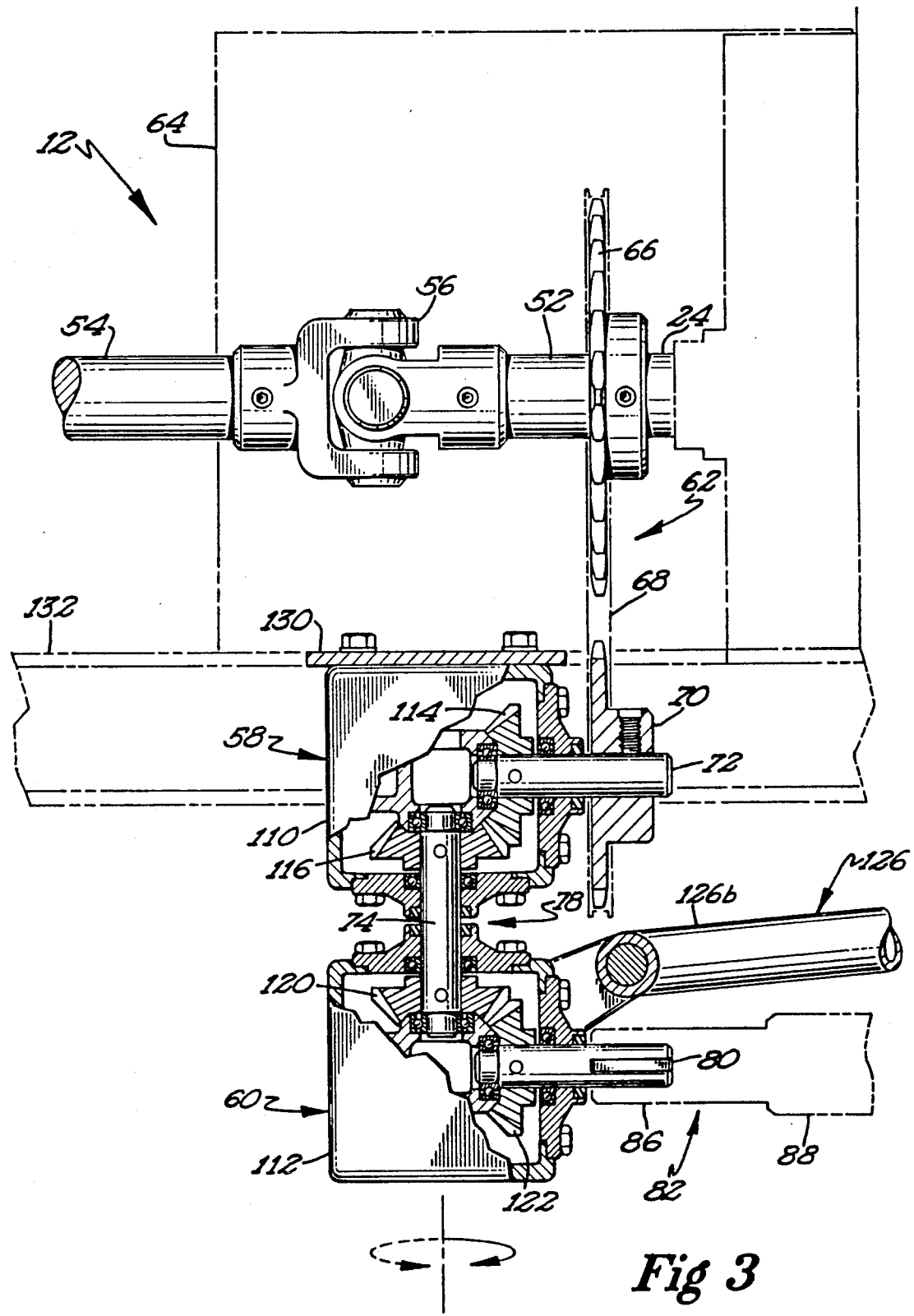
FIG. 3 is a side elevation cross-section taken along cutting plane 3—3 of FIG. 2.

Power is transmitted to the second conveyor for operation thereof through a pair of gear boxes by drive means as hereinafter described. Thus, the mechanical drive system 12 of the present invention further includes first and second gear boxes 58 and 60. As best seen in FIGS. 2 and 3, first gear box 58 is connected to input end 52 of shaft 24 by a first drive means 62. First drive means 62 is preferably substantially enclosed within a safety shield 64, as seen in FIGS. 1 and 3, which has been removed in FIG. 2 for clarity of illustration. First drive means 62 comprises a sprocket 66 rigidly attached to input end 52 of shaft 24 so as to rotate synchronously therewith. A drive chain 68 drivingly extends between sprocket 66 and a sprocket 70 attached to an input shaft 72 of first gear box 58. Power is transmitted through first gear box 58 from input shaft 72 to an output shaft 74. Output shaft 74, in turn, is attached to second gear box 60 by a second drive means 78. As best shown in FIG. 3, second gear box 60 may be disposed substantially vertically below first gear box 58 and second drive means 78 can comprise an integral output/input shaft 74 connecting the power output side of first gearbox 58 to the power input side of second gear box 60. Power is then transmitted through second gear box 60 to an output shaft 80, which is attached to a third drive means 82 connecting the output side of second gear box 60 to the second conveyor auger shaft 26 at its input end 84. Third drive means 82 comprises a telescoping drive shaft 86 having a U-joint 88 for attachment to output shaft 80 of second gear box 60 and another U-joint 90 at its other end for attachment to a drive shaft 92. Preferably, drive shaft 92 is rigidly but rotatably supported at its U-joint connection to drive shaft 86 by second auger housing 22.

Drive shaft 92 extends along second conveyor 18 substantially parallel to auger shaft 26 through hopper 38. The power output end 94 of drive shaft 92 is attached to input end 84 of second auger shaft 26 by means of a drive chain 98 extending between a sprocket 100 attached to end 94 of shaft 92 and a sprocket 102 attached to end 84 of auger shaft 26.

Thus, the mechanical drive system 12 disclosed herein provides means for driving a dual conveyor system at the input end of each conveyor from a single power source. The power is transmitted through the dual gear box previously mentioned and described hereafter. The dual gear box is best seen in FIG. 3 which is a view along cutting plane 3—3 of FIG. 2. It should be noted that gear box 58 is viewed at a different angle relative to second gearbox 60. First and second gear boxes 58 and 60 each comprise a housing 110, 112 respectively. First gear box 58 includes a pair of interacting bevel gears 114, 116 respectively, rigidly attached to input shaft 72 and output shaft 74. The bevel gear arrangement provides for a 90° change of direction in the transmission of power through the drive system. Similarly, second gear box 60 includes a pair of interacting bevel gears 120, 122 respectively attached to input end of shaft 74 and output shaft 80. The gearing within the gear boxes 58 and 60 can be selected to drive the augers 24 and 25, respectively, at the same or different relative speeds as desired. Gear box 60 also changes the direction of power transmission by 90°. Gear arrangements that change the direction of power transmission by more or less than 90° are known and are within the purview of the present invention with respect to interacting gear pairs 114, 116 and 120, 122.

Gear box 60 is free to rotate with respect to gear box 58. This rotation ability enables the operator to vary the angular position of first conveyor 16 with that of second conveyor 18. But because of this relative rotatiblity, gear box 60 must be restrained from rotating during power transmission. Thus, a guide rod 126, best seen in FIG. 1, is attached at one end thereof to second conveyor 18 and at the other end thereof to second gear box 60. Guide rod 126 fixes the position of second gear box 60 during power transmission and fixes shafts 86 and 92 in basic alignment, yet enables gear box 60 to be freely rotatable with respect to first gear box 58 so as to be able to swing second conveyor 18 around its attachment to first conveyor 16 as desired. For that purpose, guide rod 126 is comprised of two telescoping segments 126A and 126B which permit it to adjust in length as conveyor 18 is swung around on socket 44 with respect to conveyor 16.

As shown in FIG. 2, first gear box 58 is mounted to a plate 130 attached to frame 132 supporting the input end 32 of first conveyor 16. Referring now to FIG. 1, the input end of the second conveyor 18 is disposed on the left side of tractor 14. If necessary, second conveyor 18 can be rotated around its attachment to the input end of the first conveyor such that hopper 38 will be disposed on the right side of tractor 14. This may be simply and easily accomplished by simply unhitching tractor 14 from hitch 134 of first conveyor 16 and swinging hopper 38 and thus second conveyor 18 around the rotatable attachment between chute 42 and socket 44. Tractor 14 may then be re-hitched to first conveyor 16 and primary drive means 54 may be re-attached to power take-off 50. Depending upon how the input end 32 of first conveyor 16 is supported off the ground and the nature of the hitch between the tractor and the first conveyor, disattachment of guide rod 126 from second gear box 60 or second conveyor housing 22 and disattachment of drive shaft 86 at it's U-joint attachment 90 to drive shaft 92 may be necessary to swing second conveyor 18 around first conveyor 16.

Figure 4:
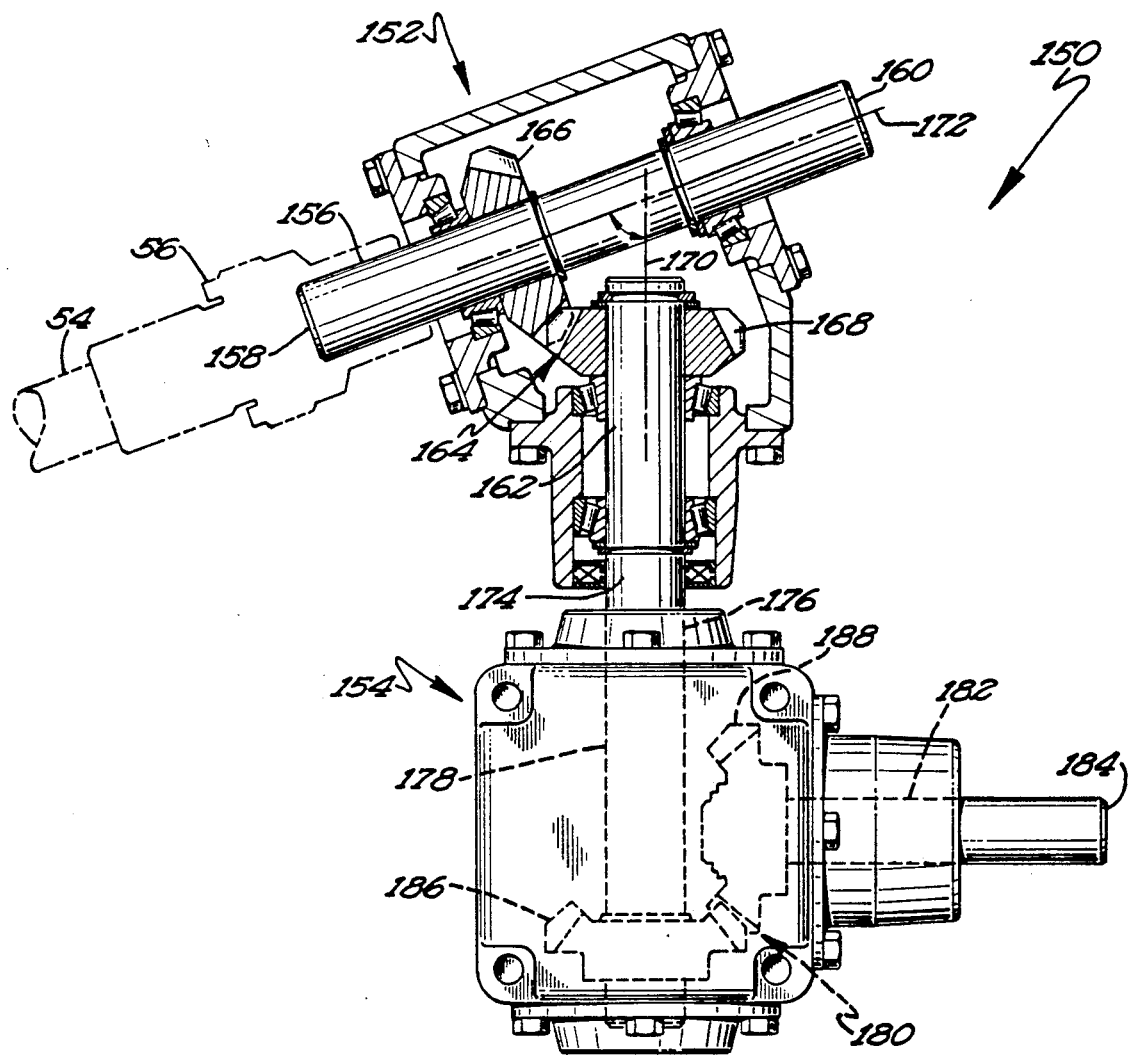
FIG. 4 is a side elevation cross-sectional view of another embodiment of the present invention.

FIG. 4 illustrates in cross section another embodiment of the present invention wherein the chain and sprocket drive of the first embodiment has been eliminated. Thus, a mechanical drive system 150 includes first and second gear boxes 152 and 154, respectively. Second gear box 154 is mounted below first gear box 152 and is rotatable with respect thereto. First gear box 152 includes a drive shaft 156 that extends from one side of gear box 152 through the opposing side. Drive shaft 156 has an input end 158 that may be drivingly connected to the power source by primary drive means 54 and an output end 160 that may be attached to auger shaft 24 of first conveyor 16 by known means such as a U-joint. Thus, the output end 160 of drive shaft 156 acts as a first output shaft to drivingly connect first conveyor 16 to the power source. If desired, output end 160 may be integral with input end 52 of auger shaft 24 of first conveyor 16, thereby forming a single unitary shaft extending through gear box 152.

First gear box 152 further includes a second output shaft 162 drivingly connected to drive shaft 156 by a gear assembly means 164. Means 164 comprises a first bevel gear 166 attached to drive shaft 156 and a second bevel gear 168 having teeth meshing with those on gear 166 and attached to second output shaft 162. Second output shaft 162 is disposed relative to drive shaft 156 such that the longitudinal axis 170 of second output shaft 162 lies substantially at a 68° angle with respect to the longitudinal axis 172 of drive shaft 156.

Second output shaft 162 is drivingly connected at its output end 174 to the input end 176 of a drive shaft 178 shown partially in phantom extending through gear box 154. As with first and second gear boxes 58 and 60 shown in FIGS. 1-3, output shaft 162 may be integral with input end 176 of drive shaft 178. Drive shaft 178 in turn is drivingly connected through a gear assembly means 180 shown in phantom to an output shaft 182, which is shown partially in phantom. Output shaft 182 has an output end 184 that may be attached to third drive means 82 previously discussed. Gear assembly means 180 includes a bevel gear 186 attached to drive shaft 178 and drivingly intermeshing with a bevel gear 188 attached to output shaft 182.

The embodiment 150 of the mechanical drive system of the present invention has the advantage of eliminating the sprocket and chain drive system of the first embodiment, thereby reducing the number of parts needing maintenance and otherwise subject to failure. It should be noted that the embodiment shown in FIG. 4 is shown from the same cutting plane as that of FIG. 3. Furthermore, it should be noted that while the drive system embodiment 150 is shown having axes 170 and 172 at a 68° angle, this angle may fall within a range of about 45° to about 90°.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A mechanical drive system for driving first and second screw conveyors from a single power source, said second conveyor provided for delivering product to said first conveyor, each of said conveyors including an auger shaft supporting an auger, each of said conveyors having input and output ends, wherein the output end of said second conveyor is pivotally attached to the input end of said first conveyor for supplying product to said first conveyor, said system comprising:
   a primary drive means for providing power to said first conveyor, said primary drive means being connected to provide driving power between said auger shaft of said first conveyor at its product input end and the power source; and
   a secondary drive means for supplying power to the auger shaft of said second conveyor, said secondary drive means being connected to receive driving power from said primary drive means and comprising:
      a first gearbox having an input shaft and a first output shaft, said input shaft being connected to said primary drive means;
      a second gearbox having input and output shafts and being rotatable with respect to said first gearbox;
      power transmission means for transmitting power to said input shaft of said second gearbox from said first output shaft of said first gearbox; and
      third drive means for providing power to said auger shaft of said second conveyor, said third drive means extending externally of the auger shaft containing portion of said second conveyor between said output shaft of said second gearbox and said auger shaft of said second conveyor to drive said second conveyor from its product input end.

2. The mechanical drive system of claim 1 wherein said first gearbox changes the direction of power transmission between said first drive means and said secondary drive means by substantially ninety degrees.

3. The mechanical drive system of claim 2 wherein said second gearbox changes the direction of power transmission between said secondary drive means and said third drive means by substantially ninety degrees.

4. The mechanical drive system of claim 3 wherein said first output shaft of said first gearbox and said input shaft of said second gearbox are integral and together comprise said power transmission means.

5. The mechanical drive system of claim 1 wherein said second gearbox is rotatably supported by and disposed below said first gear box.

6. The mechanical drive means of claim 5 and further including means for preventing rotation of said second gear box relative to said first gear box during power transmission.

7. The mechanical drive system of claim 5 wherein each said first and second conveyors include a housing enveloping each said respective auger shaft and auger and wherein said first and second gear boxes are disposed externally of said housings.

8. The mechanical drive system of claim 6 wherein said means for preventing rotation includes a guide rod connected between means pivoting with said second conveyor and said second gear box.

9. The mechanical drive system of claim 1 wherein said second conveyor includes a hopper, and wherein said third drive means includes a drive shaft extending through said hopper of said second conveyor substantially parallel to the auger shaft of said second conveyor, and wherein said third drive means further includes means for drivingly connecting said drive shaft to said auger shaft of said second conveyor.

10. The mechanical drive system of claim 9 wherein said means for drivingly connecting said drive shaft to said second conveyor auger shaft includes first and second sprockets fixedly connected to said drive shaft and said second conveyor auger shaft, respectively, and further includes a drive chain extending between said first and second sprockets.

11. The mechanical drive system of claim 1 wherein said input shaft of said first gear box is connected to said primary drive means through a driving connection from said auger shaft of said first conveyor.

12. The mechanical drive system of claim 11 wherein said driving connection from said auger shaft of said first conveyor comprises a first sprocket fixedly attached to said auger shaft of said first conveyor and a second sprocket fixedly attached to said input shaft of said first gearbox, said sprockets being drivingly interconnected by a drive chain.

13. The mechanical drive system of claim 12 wherein said second sprocket is disposed substantially directly below said first sprocket, and wherein said first conveyor includes support means for supporting said first gearbox below said primary drive means.

14. The mechanical drive system of claim 11 wherein said output shaft of said first gearbox and said input shaft of said second gearbox are integral and together comprise said power transmission means.

15. The mechanical drive system of claim 14 wherein second gearbox is rotatably supported by and disposed below said first gear box.

16. The mechanical drive system of claim 14 and further including a guide rod extending between said second conveyor and said second gearbox to prevent said second gearbox from rotating during power transmission.

17. The mechanical drive system of claim 11 wherein said first conveyor includes support means for supporting said first gearbox below said primary drive means.

18. The mechanical drive system of claim 1 wherein said first gearbox includes an output shaft means for providing driving power to said auger shaft of said first conveyor.

19. The mechanical drive means of claim 18 and further including means for preventing rotation of said second gear box relative to said first gear box during power transmission.

20. The mechanical drive system of claim 18 wherein said input shaft of said first gearbox and said output shaft means are integral.

21. The mechanical drive system of claim 18 wherein said input shaft and said output shaft of said first gearbox each have a longitudinal axis and wherein said axes are disposed relative to each other at an angle in the range of about 45° to about 90°.

22. The mechanical drive means of claim 21 and further including means for preventing rotation of said second gear box relative to said first gear box during power transmission.

23. The mechanical drive system of claim 18 wherein said first and second conveyors are driven from their respective product input ends.

24. The mechanical drive system of claim 18 wherein said first output shaft of said first gearbox and said input shaft of said second gearbox are integral and together comprise said power transmission means.

25. The mechanical drive system of claim 18 wherein said second conveyor includes a hopper, and wherein said third drive means includes a drive shaft extending through said hopper of said second conveyor substantially parallel to the auger shaft of said second conveyor, and wherein said third drive means further includes means for drivingly connecting said drive shaft to said auger shaft of said second conveyor.

26. The mechanical drive system of claim 25 wherein said means for drivingly connecting said drive shaft to said second conveyor auger shaft includes first and second sprockets fixedly connected to said drive shaft and said second conveyor auger shaft, respectively, and further includes a drive chain extending between said first and second sprockets.

27. The mechanical drive system of claim 18 wherein second gearbox is rotatably supported by and disposed below said first gear box.

28. The mechanical drive system of claim 18 wherein each said first and second conveyors include a housing enveloping each said respective auger shaft and auger and wherein said first and second gear boxes are disposed externally of said housings.

29. The mechanical drive system of claim 19 wherein said means for preventing rotation includes a guide rod connected between said second conveyor and said second gear box.

30. The mechanical drive system of claim 22 wherein said means for preventing rotation includes a guide rod connected between means pivoting with said second conveyor and said second gear box.

31. The mechanical drive system of claim 1 wherein each said first and second conveyors include a housing enveloping each said respective auger shaft and auger and wherein said first and second gear boxes are disposed externally of said housings.

* * * * *